United States Patent
Garg et al.

(10) Patent No.: US 11,620,651 B2
(45) Date of Patent: Apr. 4, 2023

(54) METHOD AND SYSTEM FOR BLOCKING AND UNBLOCKING MERCHANTS FOR FUTURE TRANSACTIONS

(71) Applicant: MASTERCARD INTERNATIONAL INCORPORATED, Purchase, NY (US)

(72) Inventors: Chandan Garg, Haryana (IN); Jaipal Singh Kumawat, Rajasthan (IN); Sandeep Parvathareddy, Andhra Pradesh (IN)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 877 days.

(21) Appl. No.: 16/508,476

(22) Filed: Jul. 11, 2019

(65) Prior Publication Data
US 2021/0012341 A1    Jan. 14, 2021

(51) Int. Cl.
G06Q 20/40 (2012.01)
G06Q 20/32 (2012.01)
G06Q 20/42 (2012.01)

(52) U.S. Cl.
CPC ..... G06Q 20/4012 (2013.01); G06Q 20/3224 (2013.01); G06Q 20/405 (2013.01); G06Q 20/42 (2013.01)

(58) Field of Classification Search
CPC .............................................. G06Q 20/00–425
See application file for complete search history.

(56) References Cited

U.S. PATENT DOCUMENTS

| | | | |
|---|---|---|---|
| 6,636,833 B1 | 10/2003 | Flitcroft et al. | |
| 7,136,835 B1 | 11/2006 | Flitcroft et al. | |
| 7,359,880 B2 | 4/2008 | Abel et al. | |
| 7,567,934 B2 | 7/2009 | Flitcroft et al. | |
| 7,571,142 B1 | 8/2009 | Flitcroft et al. | |
| 7,593,896 B1 | 9/2009 | Flitcroft et al. | |
| 7,716,491 B2 * | 5/2010 | Brookner | G07F 7/1025 713/184 |
| 7,895,122 B2 | 2/2011 | Flitcroft et al. | |
| 7,954,704 B1 * | 6/2011 | Gephart | G07F 7/1025 705/72 |

(Continued)

OTHER PUBLICATIONS

Halvorsen, H., Structured Query Language, https://wwww.halvorsen.blog, 2017 (Year: 2017).*

*Primary Examiner* — John W Hayes
*Assistant Examiner* — Chenyuh Kuo
(74) *Attorney, Agent, or Firm* — Panitch Schwarze Belisario & Nadel LLP

(57) ABSTRACT

A method for establishing account controls for a transaction account through specially configured personal identification numbers includes: storing, in an account profile, an account identifier, standard personal identification number (PIN), and blocking PIN; receiving a first authorization request for a first payment transaction including the account identifier, a merchant identifier, and the blocking PIN; inserting the merchant identifier into the account profile; receiving a second authorization request for a second payment transaction including the account identifier and the merchant identifier; and transmitting an authorization response in response to the second authorization request including a response code indicating decline of the second payment transaction.

16 Claims, 5 Drawing Sheets

(56) References Cited

U.S. PATENT DOCUMENTS

| | | |
|---|---|---|
| 8,229,854 B2 | 7/2012 | Stephen et al. |
| 8,321,315 B2 | 11/2012 | Abel et al. |
| 8,510,218 B2 | 8/2013 | Abel et al. |
| 8,527,416 B2 | 9/2013 | Flitcroft et al. |
| 8,639,623 B2 | 1/2014 | Kavanagh et al. |
| 8,756,150 B2 | 6/2014 | Flitcroft et al. |
| 9,508,076 B2 * | 11/2016 | Kingston ............... G06Q 40/02 |
| 9,852,426 B2 * | 12/2017 | Bacastow ............. G06Q 20/26 |
| 11,238,441 B1 * | 2/2022 | Mullins ................. G06Q 20/34 |
| 2015/0235207 A1 * | 8/2015 | Murphy, Jr. ....... G06Q 20/4016 |
| | | 705/44 |
| 2015/0332267 A1 * | 11/2015 | Fletcher ............. G06Q 20/4016 |
| | | 705/44 |

* cited by examiner

METHOD AND SYSTEM FOR BLOCKING AND UNBLOCKING MERCHANTS FOR FUTURE TRANSACTIONS

FIELD

The present disclosure relates to the blocking and unblocking of merchants for future transactions, specifically the use of specially designated personal identification numbers to establish or remove transaction controls for a merchant or geographic area while at a point of sale.

BACKGROUND

Account controls and transaction controls provide consumers with a vast amount of control over their transaction accounts and how they are used. Controls can limit practically any activity for a transaction account, such as by placing limits on the amount that can be spent, what merchants the account can be used at, geographic areas where the account can be used, times of days and days of the week where the transaction account is valid, etc., where controls can be applicable on a per-transaction basis or any period desired by the consumer. Such controls can help consumers with self-budgeting and impulse control, and can also be of great assistance to parents, such as by limiting spending of children, as well as employers, which may control use of a corporate account by employees.

Typically, transaction controls are created and managed through websites or application programs executed by computing devices. For instance, a consumer may review their spending on their smart phone and open up an application program that will let them set and modify transaction controls to adjust their spending as they see fit. In another example, a parent may get a text message regarding an attempted transaction by their child, where the parent may be able to give permission via a return text message for a control to be exceeded depending on the purchase. However, such implementations rely on two things: access to a suitable computing device by the consumer, and the foresight to set transaction controls prior to a transaction or memory to set transaction controls at a later time after a transaction is conducted.

In some cases, a consumer may not have a smart phone or other device that can be used to set or manage transaction controls. In addition, it may be difficult for some consumers to remember to log in to their account later on and set transaction controls for a merchant that they visit. Thus, there is a need for a technical solution that can enable a consumer to quickly and easily set and remove transaction controls for a merchant or geographic area while at that merchant, without the need for additional hardware and computing devices.

SUMMARY

The present disclosure provides a description of systems and methods for establishing account controls for a transaction account through specially configured personal identification numbers (PINs). A consumer may have a traditional, standard PIN set for their transaction account that they use for authentication when conducting a payment transaction. In the present disclosure, a consumer may also have an additional PIN, which may be referred to herein as a "blocking" PIN. When the consumer wants to block future transactions for a merchant, the consumer can use their blocking PIN instead of their standard PIN for the transaction. During processing of the transaction, the use of the alternative blocking PIN is identified. In such a case, the merchant identification number of the merchant involved in the transaction is pulled and stored in a profile for the consumer. Any future transactions involving that merchant, as identified by their merchant identification number, will be blocked during processing. As a result, a consumer can easily and quickly set a control to block a merchant while at the point of sale and during a transaction, without the need for additional devices or having to remember to set a control at a later time. In some cases, entry of the blocking PIN again, or a different unblocking PIN (which could be the standard PIN) for a future transaction at the merchant may result in removal of the block for that merchant. In some cases, the blocking PIN, or an additional PIN, could be used to block geographic areas instead of just a single merchant, providing even greater control and security for consumers.

A method for establishing account controls for a transaction account through specially configured personal identification numbers includes: storing, in an account profile in an account database of a processing server, at least an account identifier, a standard personal identification number (PIN), and a blocking PIN; receiving, by a receiver of the processing server, a first authorization request for a first payment transaction formatted according to one or more standards governing exchange of financial transaction messages, where the first authorization request includes at least the account identifier, a merchant identifier, and the blocking PIN; executing, by a processing device of the processing server, a query on the account database to insert the merchant identifier into the account profile; receiving, by the receiver of the processing server, a second authorization request for a second payment transaction formatted according to the one or more standards governing exchange of financial transaction messages, where the second authorization request includes at least the account identifier and the merchant identifier; and transmitting, by a transmitter of the processing server, an authorization response in response to the second authorization request, wherein the authorization response is formatted according to the one or more standards governing exchange of financial transaction messages and includes at least a response code indicating decline of the second payment transaction.

A system for establishing account controls for a transaction account through specially configured personal identification numbers includes: a transmitter of a processing server; an account database of the processing server configured to store an account profile including at least an account identifier, a standard personal identification number (PIN), and a blocking PIN; a receiver of the processing server configured to receive a first authorization request for a first payment transaction formatted according to one or more standards governing exchange of financial transaction messages, where the first authorization request includes at least the account identifier, a merchant identifier, and the blocking PIN; and a processing device of the processing server configured to execute a query on the account database to insert the merchant identifier into the account profile, wherein the receiver of the processing server is further configured to receive a second authorization request for a second payment transaction formatted according to the one or more standards governing exchange of financial transaction messages, where the second authorization request includes at least the account identifier and the merchant identifier, and the transmitter of the processing server is configured to transmit an authorization response in response to the second authorization request, wherein the authorization response is formatted according to the one or more standards governing exchange of financial transaction messages and includes at least a response code indicating decline of the second payment transaction.

BRIEF DESCRIPTION OF THE DRAWING FIGURES

The scope of the present disclosure is best understood from the following detailed description of exemplary embodiments when read in conjunction with the accompanying drawings. Included in the drawings are the following figures.

Figure 1:
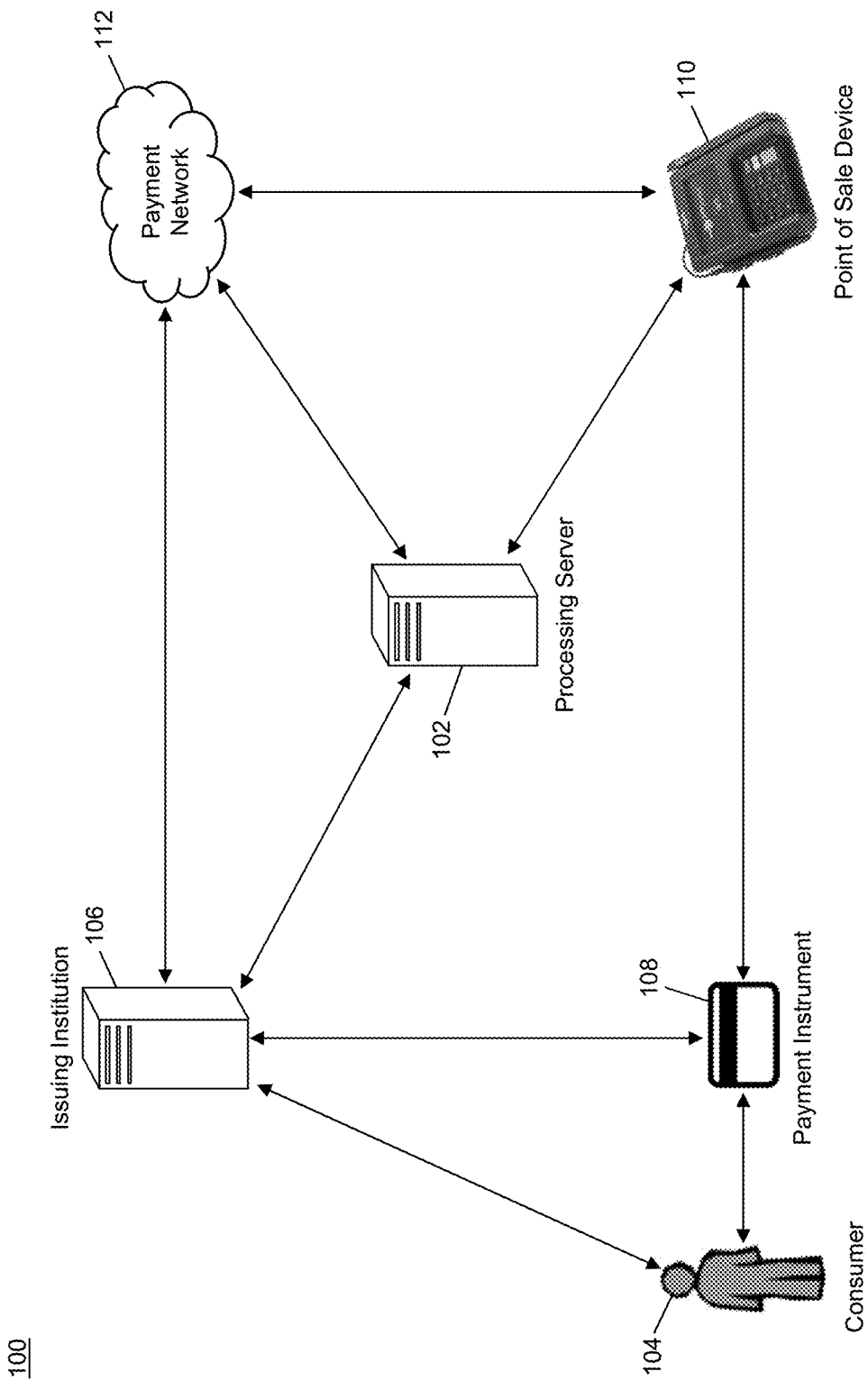
FIG. 1 is a block diagram illustrating a high level system architecture for establishing of account controls through specially configured personal identification numbers in accordance with exemplary embodiments.

Further areas of applicability of the present disclosure will become apparent from the detailed description provided hereinafter. It should be understood that the detailed description of exemplary embodiments are intended for illustration purposes only and are, therefore, not intended to necessarily limit the scope of the disclosure.

DETAILED DESCRIPTION

Glossary of Terms

Transaction Account—A financial account that may be used to fund a transaction, such as a checking account, savings account, credit account, virtual payment account, etc. A transaction account may be associated with a consumer, which may be any suitable type of entity associated with a payment account, which may include a person, family, company, corporation, governmental entity, etc. In some instances, a transaction account may be virtual, such as those accounts operated by PayPal®, etc.

Issuer—An entity that establishes (e.g., opens) a letter or line of credit in favor of a beneficiary, and honors drafts drawn by the beneficiary against the amount specified in the letter or line of credit. In many instances, the issuer may be a bank or other financial institution authorized to open lines of credit. In some instances, any entity that may extend a line of credit to a beneficiary may be considered an issuer. The line of credit opened by the issuer may be represented in the form of a payment account, and may be drawn on by the beneficiary via the use of a payment card. An issuer may also offer additional types of payment accounts to consumers as will be apparent to persons having skill in the relevant art, such as debit accounts, prepaid accounts, electronic wallet accounts, savings accounts, checking accounts, etc., and may provide consumers with physical or non-physical means for accessing and/or utilizing such an account, such as debit cards, prepaid cards, automated teller machine cards, electronic wallets, checks, etc.

Merchant—An entity that provides products (e.g., goods and/or services) for purchase by another entity, such as a consumer or another merchant. A merchant may be a consumer, a retailer, a wholesaler, a manufacturer, or any other type of entity that may provide products for purchase as will be apparent to persons having skill in the relevant art. In some instances, a merchant may have special knowledge in the goods and/or services provided for purchase. In other instances, a merchant may not have or require any special knowledge in offered products. In some embodiments, an entity involved in a single transaction may be considered a merchant. In some instances, as used herein, the term "merchant" may refer to an apparatus or device of a merchant entity.

Payment Network—A system or network used for the transfer of money via the use of cash-substitutes for thousands, millions, and even billions of transactions during a given period. Payment networks may use a variety of different protocols and procedures in order to process the transfer of money for various types of transactions. Transactions that may be performed via a payment network may include product or service purchases, credit purchases, debit transactions, fund transfers, account withdrawals, etc. Payment networks may be configured to perform transactions via cash-substitutes, which may include payment cards, letters of credit, checks, transaction accounts, etc. Examples of networks or systems configured to perform as payment networks include those operated by Mastercard®, VISA®, Discover®, American Express®, PayPal®, etc. Use of the term "payment network" herein may refer to both the payment network as an entity, and the physical payment network, such as the equipment, hardware, and software comprising the payment network.

Payment Rails—Infrastructure associated with a payment network used in the processing of payment transactions and the communication of transaction messages and other similar data between the payment network and other entities interconnected with the payment network that handles thousands, millions, and even billions of transactions during a given period. The payment rails may be comprised of the hardware used to establish the payment network and the interconnections between the payment network and other associated entities, such as financial institutions, gateway processors, etc. In some instances, payment rails may also be affected by software, such as via special programming of the communication hardware and devices that comprise the payment rails. For example, the payment rails may include specifically configured computing devices that are specially configured for the routing of transaction messages, which may be specially formatted data messages that are electronically transmitted via the payment rails, as discussed in more detail below.

Point of Sale—A computing device or computing system configured to receive interaction with a user (e.g., a consumer, employee, etc.) for entering in transaction data, payment data, and/or other suitable types of data for the purchase of and/or payment for goods and/or services. The point of sale may be a physical device (e.g., a cash register, kiosk, desktop computer, smart phone, tablet computer, etc.) in a physical location that a customer visits as part of the transaction, such as in a "brick and mortar" store, or may be virtual in e-commerce environments, such as online retailers receiving communications from customers over a network such as the Internet. In instances where the point of sale may be virtual, the computing device operated by the user to initiate the transaction or the computing system that receives data as a result of the transaction may be considered the point of sale, as applicable.

Payment Transaction—A transaction between two entities in which money or other financial benefit is exchanged from one entity to the other. The payment transaction may be a transfer of funds, for the purchase of goods or services, for the repayment of debt, or for any other exchange of financial benefit as will be apparent to persons having skill in the relevant art. In some instances, payment transaction may refer to transactions funded via a payment card and/or payment account, such as credit card transactions. Such payment transactions may be processed via an issuer, payment network, and acquirer. The process for processing such a payment transaction may include at least one of authorization, batching, clearing, settlement, and funding. Authorization may include the furnishing of payment details by the consumer to a merchant, the submitting of transaction details (e.g., including the payment details) from the merchant to their acquirer, and the verification of payment details with the issuer of the consumer's payment account used to fund the transaction. Batching may refer to the storing of an authorized transaction in a batch with other authorized transactions for distribution to an acquirer. Clearing may include the sending of batched transactions from the acquirer to a payment network for processing. Settlement may include the debiting of the issuer by the payment network for transactions involving beneficiaries of the issuer. In some instances, the issuer may pay the acquirer via the payment network. In other instances, the issuer may pay the acquirer directly. Funding may include payment to the merchant from the acquirer for the payment transactions that have been cleared and settled. It will be apparent to persons having skill in the relevant art that the order and/or categorization of the steps discussed above performed as part of payment transaction processing.

Controlled Payment Number—Controlled payment numbers may be payment numbers associated with a payment account that are subject to one or more rules. In many cases, these rules may be set by a cardholder, such as spending limits, limits on days and/or times of a transaction, limits on merchants or industries, transaction spending or frequency limits, etc. Controlled payment numbers may offer an account holder an opportunity to give payment cards tied to the account to others for use, but subject to rules set by the cardholder, such as an employer distributing cards to employees, or a parent distributing cards to children. Additional detail regarding controlled payment numbers may be found in U.S. Pat. No. 6,636,833, issued Oct. 21, 2003; U.S. Pat. No. 7,136,835, issued Nov. 14, 2006; U.S. Pat. No. 7,571,142, issued Aug. 4, 2009; U.S. Pat. No. 7,567,934, issued Jul. 28, 2009; U.S. Pat. No. 7,593,896, issued Sep. 22, 2009; U.S. Pat. No. 7,359,880, issued Apr. 15, 2008; U.S. Pat. No. 7,895,122, issued Feb. 22, 2011; U.S. Pat. No. 8,229,854, issued Jul. 27, 2012; U.S. Pat. No. 8,321,315, issued Nov. 27, 2012; U.S. Pat. No. 8,510,218, issued Aug. 13, 2013; U.S. Pat. No. 8,639,623, issued Dec. 27, 2012; U.S. Pat. No. 8,756,150, issued Jun. 17, 2014; and U.S. Pat. No. 8,527,416, issued Sep. 3, 2013, each of which are herein incorporated by reference in their entirety.

System for Establishing Account Controls Via PINs

FIG. 1 illustrates a system 100 for establishing and managing transaction controls for a transaction account through the use of specially configured personal identification numbers (PINs) entered during the conducting of a payment transaction involving the transaction account.

The system 100 may include a processing server 102. The processing server 102, discussed in more detail below, may be configured to assist a consumer 104 by establishing and managing controls placed on a transaction account associated with the consumer 104 through the use of specially configured PINs. In the system 100, the consumer 104 may have a transaction account issued thereto or otherwise accessible by the consumer 104. The transaction account may be issued by an issuing institution 106, which may be a financial institution, such as an issuing bank, or other entity configured to issue transaction accounts that may be used to fund an electronic payment transaction.

As part of the issuing of the transaction account, the issuing institution may issue a payment instrument 108 to the consumer 104 or that may be otherwise provided to the consumer 104 as an authorized user. The payment instrument 108 may be encoded with payment credentials for the transaction account or may be otherwise usable for conveying payment credentials for the transaction account as part of an electronic payment transaction. The payment instrument 108 may be, for instance, a credit card, debit card, check, electronic wallet, etc. The payment credentials may include at least an account identifier, which may be a unique value that is unique to the transaction account (e.g., and in some cases the individual payment instrument 108 being used, such as in cases where multiple payment instruments 108 may be issued for a single transaction account) and included in electronic payment transactions for identification of the transaction account during processing. In some embodiments, the account identifier may be the primary account number for the payment transaction. In some cases, the primary account number may be a controlled payment number. In other cases, the transaction account may be subject to account controls as discussed herein, even in instances where a controlled payment number may not be used.

As part of the issuing of the transaction account and the payment instrument 108, the consumer 104 (e.g., or an authorized party that may give the consumer 104 permission to use the payment instrument 108) may set a standard PIN for the payment instrument 108. The standard PIN may be entered as part of the authentication process when initiating a payment transaction. For transactions where a standard PIN is entered, the PIN may be verified and the transaction processed using standard techniques. In the system 100, the consumer 104 (e.g., or other authorized user) may also set a blocking PIN for the payment instrument 108 and/or transaction account. The blocking PIN may be different from the standard PIN, where use of the blocking PIN may result in the processing server 102 adding or removing account controls for the transaction account as part of the processing of a payment transaction, as discussed in more detail below. In an exemplary embodiment, the blocking PIN may be of the same format as the standard PIN, but may have a different value. For instance, the PINs may both be traditional four digit PINs, but where each are different numbers. For example, the consumer 104 may set a standard PIN of 1737 and a blocking PIN of 2018.

To conduct a payment transaction, the consumer 104 may present the payment instrument 108 to a point of sale device 110 of a merchant. The point of sale device 110 may read the payment credentials from the payment instrument 108 using any suitable method, which may be dependent on the form of the payment instrument 108. For instance, a credit card with a chip may be inserted into the point of sale device 110 such that the point of sale device 110 reads the payment credentials from the chip, a credit card with a magnetic stripe may be swiped through a reading device on the point of sale device 110, a smart phone with an electronic wallet may transmit the payment credentials to the point of sale device 110 through near field communication, the point of sale device 110 may read and decode a machine-readable code displayed on a smart phone that is encoded with the payment credentials, etc.

The point of sale device 110 may receive the payment credentials and may request entry of a PIN in the point of sale device 110 by the consumer 104. In some instances, the entry of a PIN may be requested based on an indication or other information in the payment credentials themselves. The point of sale device 110 may prompt the consumer 104 to enter their PIN, which the consumer 104 may input into the point of sale device 110 using any suitable input mechanism. In some embodiments, PIN entry may be requested and accomplished using the payment instrument 108 (e.g., when the payment instrument 108 is a smart phone with an electronic wallet application program). In such embodiments, the entered PIN may be conveyed to the point of sale device 110 with the payment credentials.

The payment transaction may be submitted to a payment network 112 for processing. For processing of the payment transaction, an authorization request may be submitted to the payment network 112 via payment rails associated therewith. In some embodiments, the authorization request may be submitted directly by the point of sale device 110 using a system of the associated merchant. In other embodiments, the authorization request may be submitted through one or more intermediate entities, such as an acquiring institution or a gateway processor. In some cases, the point of sale device 110 may generate the authorization request directly. In other cases, another system or entity may generate the authorization request using transaction data and the payment credentials (e.g., including the entered PIN) obtained by the point of sale device 110.

An authorization request may be a type of transaction message that is specially formatted according to one or more standards governing the exchange of financial transaction messages, such as the International Organization of Standardization's ISO 8583 or ISO 20022 standards. The transaction message may include a message type indicator, which indicates a type of the message, which may be an authorization request for messages submitted to the payment network 112 for processing to determine if funding of the transaction by the transaction account associated with the payment instrument 108 is approved. The transaction message may also include a plurality of data elements as set forth in the applicable standard(s), where the data elements may store transaction data and other information as dictated in the standard(s). For example, a first data element may be configured to store an account identifier, a second data element may be configured to store the entered PIN, etc. The transaction data stored in the authorization request submitted to the payment network 112 via the payment rails may, for instance, the account identifier and other payment credentials received from the payment instrument 108, a transaction amount, the entered PIN, a merchant identification number or other identifier associated with the merchant involved in the transaction, and a geographic location where the transaction is taking place (e.g., a physical location of the point of sale device 110). Other transaction data may include, for instance, a transaction time and/or date, currency type, transaction type, point of sale type, point of sale identifier, product data, offer data, reward data, loyalty data, etc.

The payment network 112 may receive the authorization request and may perform any traditional functions related to the processing thereof, such as the calculation of fraud scores, mapping of account numbers, etc. As part of the processing of the payment transaction, the authorization request may be routed to the processing server 102. In some embodiments, the processing server 102 may be a part of the payment network 112 and may perform the functions discussed herein as part of the initial functions performed by the payment network 112. In such embodiments, the PINs set by the consumer 104 for the transaction account and/or payment instrument 108 may be provided to the processing server 102 by the issuing institution 106, or may be set directly with the processing server 102 during the registration process for the PINs. In other embodiments, the processing server 102 may be a part of the issuing institution 106 and may perform the functions discussed herein as part of the processing of the payment transaction performed by the issuing institution 106. In still other embodiments, the processing server 102 may be part of a third party system used by the issuing institution 106 and/or consumer 104 for the setting of account controls. In such cases, the issuing institution 106 or payment network 112 may be configured to route the authorization request to the processing server 102, such as based on the account identifier, which may be registered with the respective entity as being a part of the service provided by the processing server 102.

The processing server 102 may receive the authorization request and identify the account identifier and entered PIN included therein. The processing server 102 may identify a profile for the transaction account and/or payment instrument 108 using the account identifier. The processing server 102 may then determine if the entered PIN was valid, and what type of PIN was entered by the consumer 104. If the entered PIN is invalid (e.g., it does not match any registered PIN), then the transaction may be denied. In some cases, the processing server 102 may deny the payment transaction directly, such as by generating an authorization response (e.g., a type of transaction message as indicated by the included message type indicator) that includes a response code (e.g., stored in an applicable data element) that indicates that the transaction is declined. In some instances, the response code may indicate a decline due to use of an incorrect PIN. In other cases, the processing server 102 may provide the issuing institution 106 or payment network 112, as applicable, the results of the validation (e.g., that an invalid PIN was entered) for processing by the appropriate entity accordingly.

If the entered PIN is valid and matches the standard PIN, then the transaction may be processed using traditional methods. If the entered PIN is valid and it matches the blocking PIN, then the processing server 102 may set an account control for the transaction account. In some embodiments, the blocking PIN may be used to block future transactions involving the merchant involved in the transaction (e.g., associated with the point of sale device 110). In such embodiments, the merchant identification number included in the authorization request may be extracted and stored in the account profile for the transaction account. In other embodiments, the blocking PIN may be used to block a geographic area. In such embodiments, the geographic location may be extracted from the authorization request and a geographic area that includes that geographic location may be identified, where the geographic area may be stored in the account profile as an account control. In some cases, the initial payment transaction may still be processed if a blocking PIN is used. For instance, in one example, the transaction may be processed prior to applicability of the account control, where the account control may only be used to stop any future transactions for that merchant or geographic area. In another example, the account control may be established and used by the processing server 102 or issuing institution 106 in the processing of that initial payment transaction. In still another example, use of the blocking PIN may always result in denial of the payment transaction. In some embodiments, the consumer 104 may set the course of action to be used when a blocking PIN is used (e.g., standard processing, processing with the account control, automatic denial, etc.). In other embodiments, the course of action may be set by the applicable issuing institution 106.

When an authorization request is received by the processing server 102, the processing server 102 may, in addition to validating the entered PIN, identify if any account controls are applicable to the transaction. The identification may include checking the merchant identification number included in the authorization request against all blocked merchant identification numbers stored in the profile for the transaction account, as well as checking the geographic location included in the authorization request against all blocked geographic areas. If the authorization request is blocked based on the data found in the profile, then the payment transaction may be denied (e.g., directly by the processing server 102 or with a recommendation for denial provided to the issuing institution 106 or payment network 112, as applicable).

In cases where an authorization request would be blocked, but a valid blocking PIN is used, the account control may be removed as a result of the repeated use of the blocking PIN. In such cases, the processing of authorization request may be based on a course of action that is set for the transaction account. For instance, in one example the payment transaction may still be denied due to the account control as still being applicable prior to its removal. In another example, the account control may be used and the payment transaction processed using traditional methods. In some embodiments, use of the standard PIN may result in removal of an account control instead of, or in addition to, use of the blocking PIN. In some cases, a special unblocking PIN may be set by the consumer 104 for the transaction account, where only the unblocking PIN may be used to remove an account control for the merchant or geographic area.

The standard processing of a payment transaction may include the forwarding of the authorization request to the issuing institution 106, which may approve or deny the payment transaction using traditional methods. For instance, the payment transaction may be denied for insufficient funds, suspected fraud, etc. even in cases where no account control is applicable and a valid standard PIN is used. The issuing institution 106 may generate an authorization response for the payment transaction that includes a response code indicating approval or denial of the payment transaction, where the authorization response may be returned to the payment network 112 for any further processing. The authorization response may then be provided back to the merchant, where the point of sale device 110 may be informed of the result of the payment transaction (e.g., approval or denial) and may inform the consumer 104 accordingly. In cases where a payment transaction is denied, the point of sale device 110 may (e.g., directly via a display device thereof or through the payment instrument 108, as applicable) display a reason for the denial, such as may be indicated by the response code.

In some embodiments, multiple blocking PINs may be registered for a transaction account. For instance, a first blocking PIN may be used to block/unblock merchants, while a second blocking PIN may be used to block/unblock geographic areas. In some cases, multiple blocking PINs may be used for geographic areas, where each PIN may correspond to a size of the geographic area (e.g., city, state, country, etc.). In some such cases, blocking PINs may have common digits where one or more digits may be changed to change the type of blocking. For example, each blocking PIN registered to a transaction account may all start with 201, where the fourth digit may determine the type of block to be applied or removed. For instance, use of the PIN 2018 may affect account controls for the merchant, while use of the PIN 2019 may affect account controls for the geographic area. In some cases, a mix of types of blocking PINs may be used. For example, a blocking PIN of 1737 for merchants, a blocking PIN of 2018 for a city, and a blocking PIN of 2019 for states. As discussed herein, account controls may be used to set blocks for payment transactions using any possible type of control that may go beyond merchants and geographic areas, such as account controls set for days, times, products, currencies, transaction amounts, etc.

The methods and systems discussed herein may enable a consumer 104 to quickly and easily block or unblock merchants, geographic areas, etc. via the use of account controls that are established and managed through the use of PINs. By using PINs, the consumer 104 does not need to use any external devices to manage their account controls, and may be able to set them while conducting payment transactions for significantly higher convenience and to mitigate the possibility of forgetfulness. For example, the consumer 104 may visit a merchant where they may be concerned an employee of the merchant or other nefarious entity is going to attempt to conduct additional transactions using their payment information. The consumer 104 can simply use a blocking PIN instead of their standard PIN to prevent any future transactions involving that merchant, while still enabling that transaction to go through depending on their settings. Similarly, a consumer 104 may be wary of an area they travel to and want to prevent any unauthorized transactions in the area, and may thus use the blocking PIN at a point of sale device 110 to quickly and discretely set an account control. Thus, the methods and systems discussed herein provide convenient and accessible account controls in a manner that cannot be accomplished with traditional control systems.

Processing Server

Figure 2:
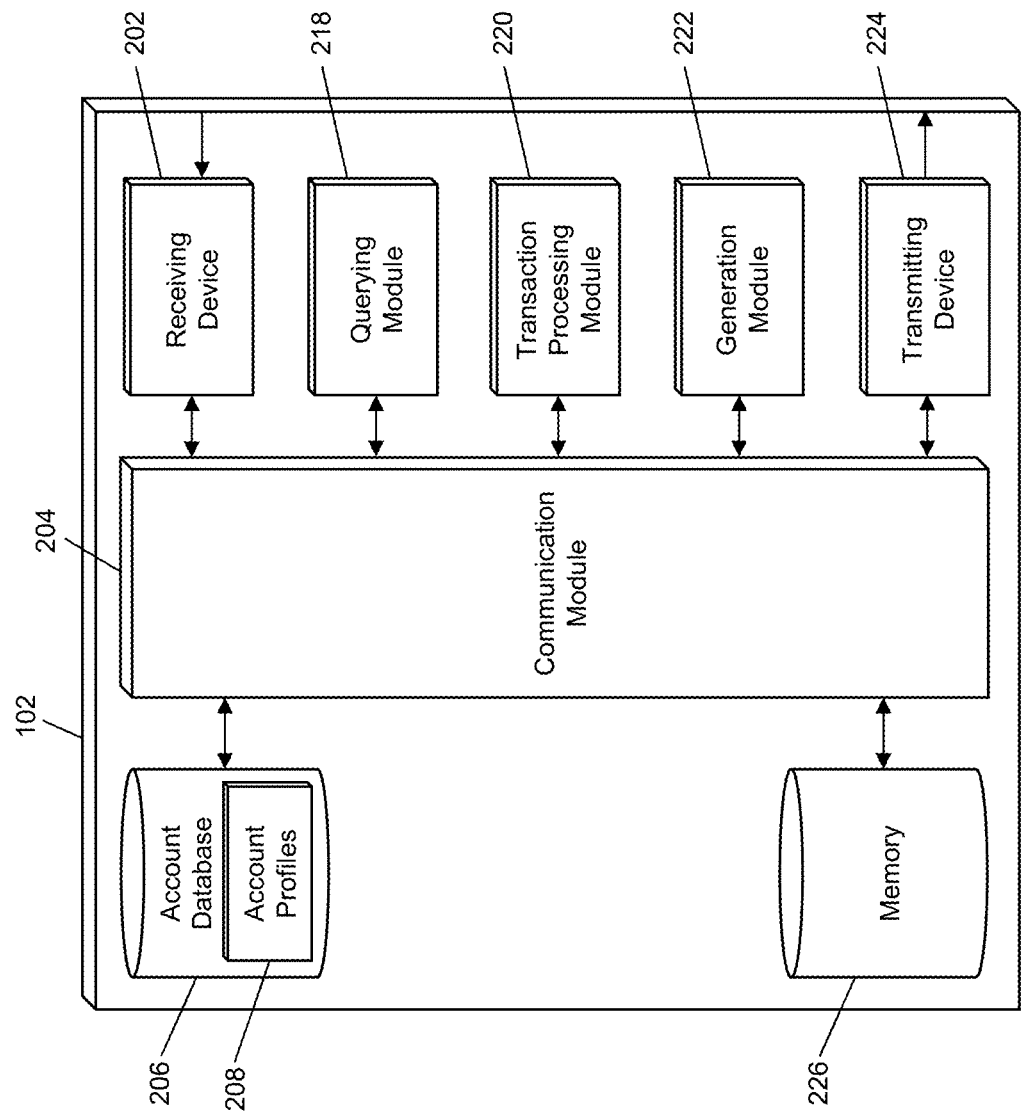
FIG. 2 is a block diagram illustrating the processing server of the system of FIG. 1 for establishing account controls through specially configured personal identification numbers in accordance with exemplary embodiments.

FIG. 2 illustrates an embodiment of a processing server 102 in the system 100. It will be apparent to persons having skill in the relevant art that the embodiment of the processing server 102 illustrated in FIG. 2 is provided as illustration only and may not be exhaustive to all possible configurations of the processing server 102 suitable for performing the functions as discussed herein. For example, the computer system 500 illustrated in FIG. 5 and discussed in more detail below may be a suitable configuration of the processing server 102.

The processing server 102 may include a receiving device 202. The receiving device 202 may be configured to receive data over one or more networks via one or more network protocols. In some instances, the receiving device 202 may be configured to receive data from issuing institutions 106, point of sale devices 110, payment networks 112, and other systems and entities via one or more communication methods, such as radio frequency, local area networks, wireless area networks, cellular communication networks, Bluetooth, the Internet, etc. In some embodiments, the receiving device 202 may be comprised of multiple devices, such as different receiving devices for receiving data over different networks, such as a first receiving device for receiving data over a local area network and a second receiving device for receiving data via the Internet. The receiving device 202 may receive electronically transmitted data signals, where data may be superimposed or otherwise encoded on the data signal and decoded, parsed, read, or otherwise obtained via receipt of the data signal by the receiving device 202. In some instances, the receiving device 202 may include a parsing module for parsing the received data signal to obtain the data superimposed thereon. For example, the receiving device 202 may include a parser program configured to receive and transform the received data signal into usable input for the functions performed by the processing device to carry out the methods and systems described herein.

The receiving device 202 may be configured to receive data signals electronically transmitted by issuing institutions 106, which may be superimposed or otherwise encoded with account identifiers and registered PINs associated therewith. The receiving device 202 may also be configured to receive data signals electronically transmitted by issuing institutions 106, point of sale devices 110, and payment networks 112, which may be superimposed or otherwise encoded with authorization requests for payment transactions, which may include account identifiers, merchant identification numbers, geographic locations, payment credentials, PINs, and other data as discussed herein.

The processing server 102 may also include a communication module 204. The communication module 204 may be configured to transmit data between modules, engines, databases, memories, and other components of the processing server 102 for use in performing the functions discussed herein. The communication module 204 may be comprised of one or more communication types and utilize various communication methods for communications within a computing device. For example, the communication module 204 may be comprised of a bus, contact pin connectors, wires, etc. In some embodiments, the communication module 204 may also be configured to communicate between internal components of the processing server 102 and external components of the processing server 102, such as externally connected databases, display devices, input devices, etc. The processing server 102 may also include a processing device. The processing device may be configured to perform the functions of the processing server 102 discussed herein as will be apparent to persons having skill in the relevant art. In some embodiments, the processing device may include and/or be comprised of a plurality of engines and/or modules specially configured to perform one or more functions of the processing device, such as a querying module 218, transaction processing module 220, generation module 222, etc. As used herein, the term "module" may be software or hardware particularly programmed to receive an input, perform one or more processes using the input, and provides an output. The input, output, and processes performed by various modules will be apparent to one skilled in the art based upon the present disclosure.

The processing server 102 may include an account database 206. The account database 206 may be configured to store a plurality of account profiles 208 using a suitable data storage format and schema. The account database 206 may be a relational database that utilizes structured query language for the storage, identification, modifying, updating, accessing, etc. of structured data sets stored therein. Each account profile 208 may be a structured data set configured to store data related to a transaction account. An account profile 208 may include at least an account identifier uniquely associated with the related transaction account, a standard PIN, one or more blocking PINs, and any account controls applicable to the related transaction account.

The processing server 102 may include a querying module 218. The querying module 218 may be configured to execute queries on databases to identify information. The querying module 218 may receive one or more data values or query strings, and may execute a query string based thereon on an indicated database, such as the account profile 206 of the processing server 102 to identify information stored therein. The querying module 218 may then output the identified information to an appropriate engine or module of the processing server 102 as necessary. The querying module 218 may, for example, execute a query on the account profile 208 to identify the PINs stored therein for validation of an entered PIN included in a received authorization request, and to insert or remove account controls based on usage of blocking PINs.

The processing server 102 may also include a transaction processing module 220. The transaction processing module 220 may be configured to perform functions of the processing server 102 related to the processing of electronic payment transactions, such as the extracting of data from authorization requests, generation of transaction messages, routing of transaction messages to issuing institutions 106 and payment networks 112, formatting of transaction messages according to applicable standards, etc. In cases where the processing server 102 is a part of the issuing institution 106 or payment network 112, the transaction processing module 220 may be further configured to perform processing functions of the respective entities.

The processing server 102 may also include a generation module 222. The generation module 222 may be configured to generate data for use by the processing server 102 in performing the functions discussed herein. The generation module 222 may receive instructions as input, may generate data based on the instructions, and may output the generated data to one or more modules of the processing server 102. For example, the generation module 222 may be configured to generate account controls based on data included in authorization requests, identify geographic areas based on geographic locations for inclusion in account controls, generate authorization responses for denial of payment transactions, etc.

The processing server 102 may also include a transmitting device 224. The transmitting device 224 may be configured to transmit data over one or more networks via one or more network protocols. In some instances, the transmitting device 224 may be configured to transmit data to issuing institutions 106, point of sale devices 110, payment networks 112, and other entities via one or more communication methods, local area networks, wireless area networks, cellular communication, Bluetooth, radio frequency, the Internet, etc. In some embodiments, the transmitting device 224 may be comprised of multiple devices, such as different transmitting devices for transmitting data over different networks, such as a first transmitting device for transmitting data over a local area network and a second transmitting device for transmitting data via the Internet. The transmitting device 224 may electronically transmit data signals that have data superimposed that may be parsed by a receiving computing device. In some instances, the transmitting device 224 may include one or more modules for superimposing, encoding, or otherwise formatting data into data signals suitable for transmission.

The transmitting device 224 may be configured to electronically transmit data signals to issuing institutions 106 that are superimposed or otherwise encoded with requests for transaction account data, such as for registered PINs, or notifications of updates to transaction account data, such as changes to PINs and/or account controls. The transmitting device 224 may also be configured to electronically transmit data signals to issuing institutions 106, point of sale devices 110, and payment networks 112 that are superimposed or otherwise encoded with transaction messages including authorization requests for processing and authorization responses for processed payment transactions.

The processing server 102 may also include a memory 226. The memory 226 may be configured to store data for use by the processing server 102 in performing the functions discussed herein, such as public and private keys, symmetric keys, etc. The memory 226 may be configured to store data using suitable data formatting methods and schema and may be any suitable type of memory, such as read-only memory, random access memory, etc. The memory 226 may include, for example, encryption keys and algorithms, communication protocols and standards, data formatting standards and protocols, program code for modules and application programs of the processing device, and other data that may be suitable for use by the processing server 102 in the performance of the functions disclosed herein as will be apparent to persons having skill in the relevant art. In some embodiments, the memory 226 may be comprised of or may otherwise include a relational database that utilizes structured query language for the storage, identification, modifying, updating, accessing, etc. of structured data sets stored therein. The memory 226 may be configured to store, for example, formatting standards, routing information for payment rails, data for the creation of account controls, geographic area and location data, etc.

Processing of Transactions Through Specially Configured PINs

Figure 3:
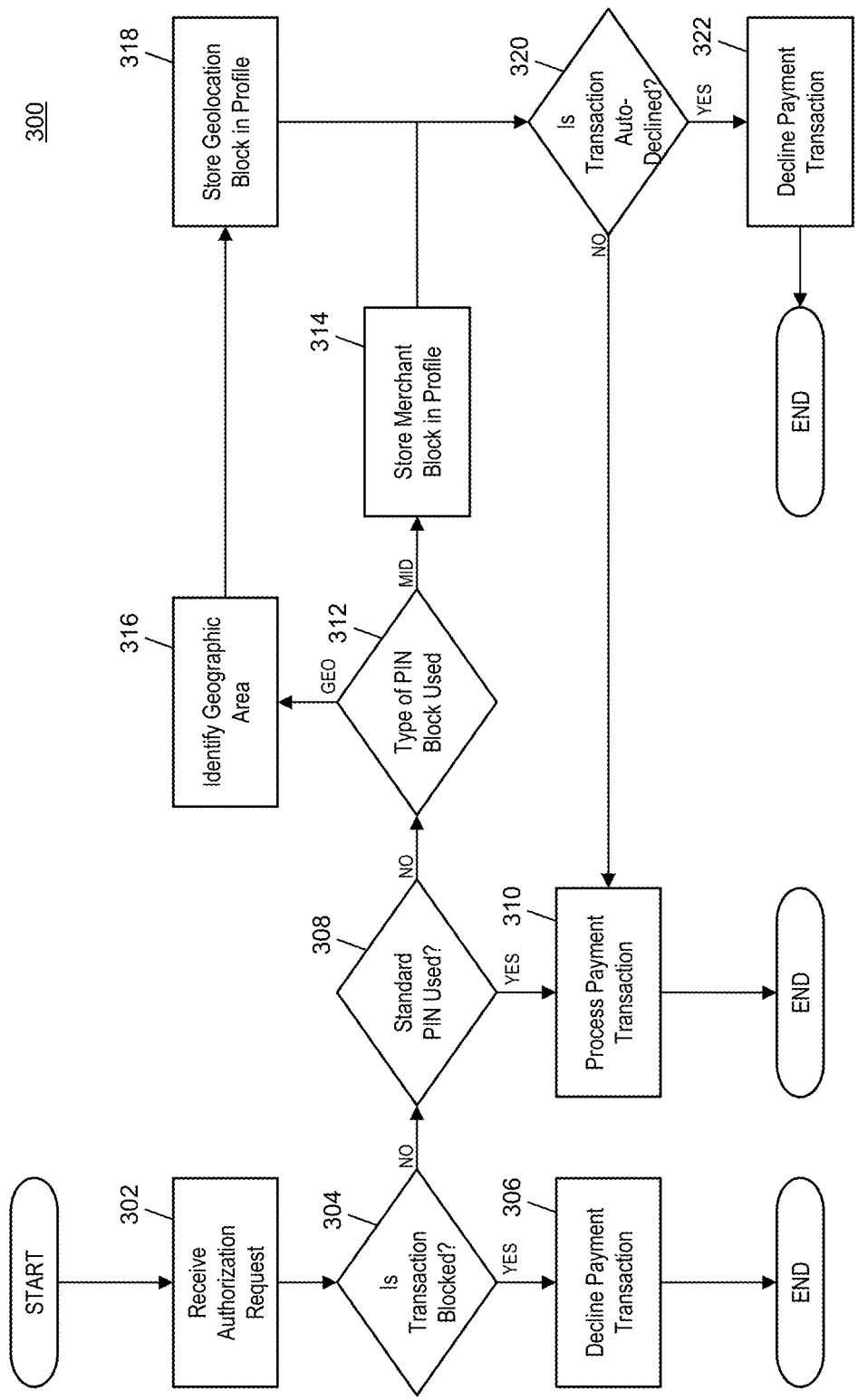
FIG. 3 is a flow diagram illustrating a process for establishing and managing account controls through personal identification numbers as executed by the processing server of FIG. 2 in accordance with exemplary embodiments.

FIG. 3 illustrates an example process 300 executed by the processing server 102 of FIG. 2 for use in the system 100 of FIG. 1 for the processing of electronic payment transactions with applicable transaction controls through the use of specially configured PINs.

In step 302, the receiving device 202 of the processing server 102 may receive an authorization request for a payment transaction, such as from a payment network 112 via payment rails associated therewith or an issuing institution 106. The authorization request may be formatted according to one or more standards governing the exchange of financial transaction messages and include at least an account identifier, a merchant identifier, a geographic location, and an entered PIN. In step 304, the transaction processing module 220 of the processing server 102 may determine if the payment transaction is blocked due to an existing account control. The determination may be based on an identification (e.g., via a query executed by the querying module 218 of the processing server 102) of an account profile 208 for the transaction account used in the payment transaction and an identification of blocked merchant identification numbers (MIDs) and geographic areas included therein as compared to the merchant identifier and geographic location in the authorization request. If the transaction is blocked, then, in step 306, the generation module 222 of the processing server 102 may generate an authorization response for the payment transaction that includes a response code indicating denial of the payment transaction, where the transmitting device 224 of the processing server 102 may transmit the authorization response to the issuing institution 106, payment network 112, or other appropriate entity. The process 300 may then be completed as the transaction is denied. In some embodiments, if a blocking PIN is used, an unblocking process may be performed, as discussed above.

If the payment transaction is not blocked due to any existing account controls, then, in step 308, the processing server 102 may determine what type of PIN was used by the consumer 104 in the payment transaction by comparing the entered PIN included in the authorization request with the PINs registered in the applicable account profile 208 as identified using the account identifier. If the standard PIN was used, then, in step 310, the transmitting device 224 of the processing server 102 may forward the authorization request to the issuing institution 106 or payment network 112 for processing of the payment transaction using standard methods. If a standard PIN is not used, then, in step 312, the processing server 102 may determine the type of blocking PIN was that used, by comparing each registered blocking PIN to the entered PIN.

If a blocking PIN that is used for blocking of merchants is used, then, in step 314, the querying module 218 of the processing server 102 may execute a query on the account database 206 of the processing server 102 to insert the MID found in the authorization request into the account profile 208 associated with the transaction account (e.g., identified using the account identifier in the authorization request). If a blocking PIN for geographic areas is used, then, in step 316, the processing server 102 may identify a geographic area that includes the geographic location that is included in the authorization request. In step 318, the querying module 218 of the processing server 102 may execute a query on the account database 206 of the processing server 102 to insert the geographic area into the account profile 208.

In step 320, the processing server 102 may determine if the payment transaction being processed is to be automatically declined, such as based on the preferences of the consumer 104, which may be found in the identified account profile 208. If the transaction is not to be automatically declined, then the process 300 may proceed to step 310 where the authorization request may be forwarded to an appropriate entity for standard processing of the payment transaction. If the transaction is to be automatically declined, them, in step 322, the generation module 222 of the processing server 102 may generate an authorization response for the payment transaction that includes a response code indicating denial of the payment transaction, where the transmitting device 224 of the processing server 102 may transmit the authorization response to the issuing institution 106, payment network 112, or other appropriate entity.

Figure 4:
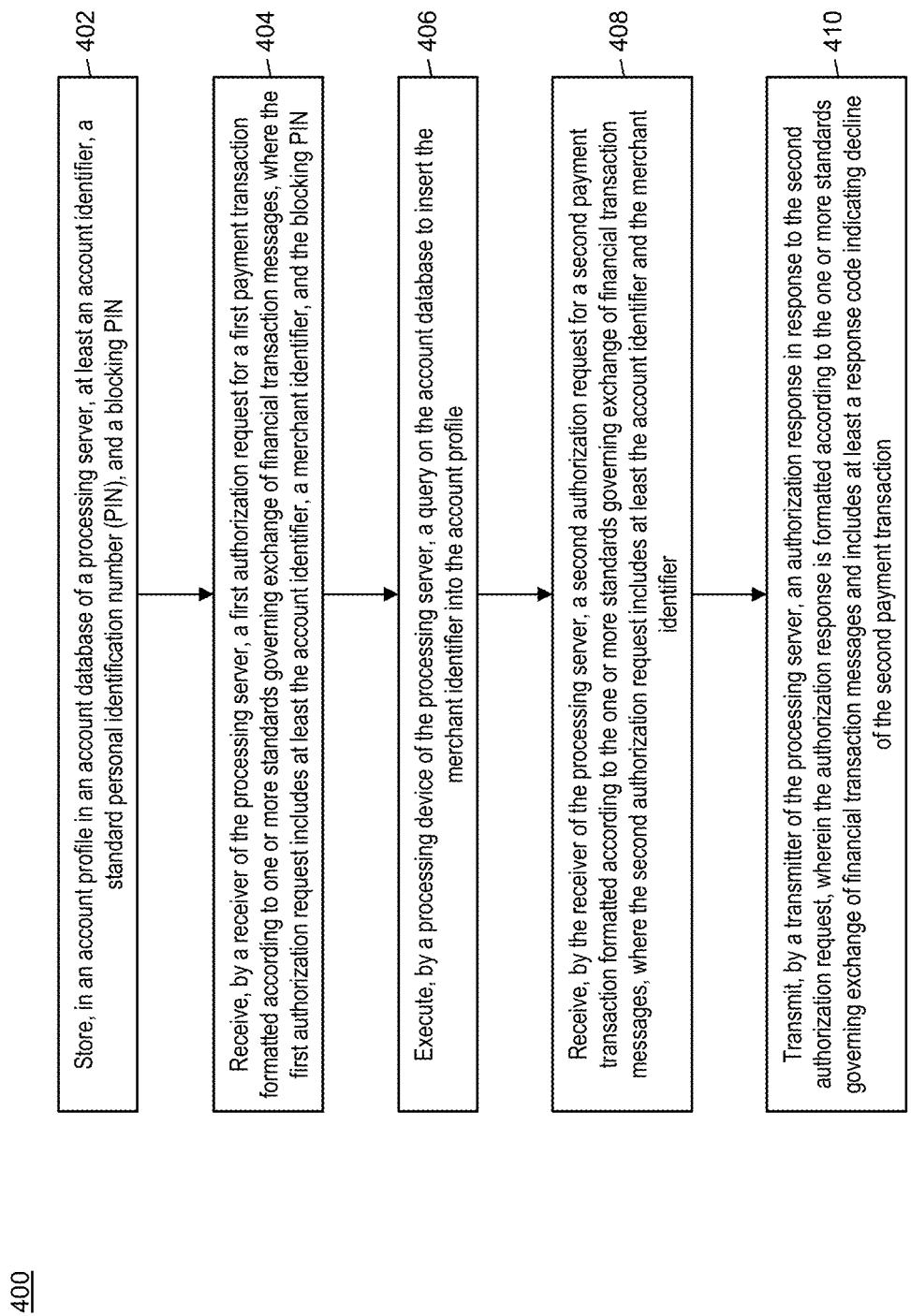
FIG. 4 is a flow chart illustrating an exemplary method for establishing account controls for a transaction account through specially configured personal identification numbers in accordance with exemplary embodiments.

Exemplary Method for Establishing Account Controls Through a Personal Identification Number FIG. 4 illustrates a method 400 for the establishing of account controls for a transaction account through the use of specially configured personal identification numbers.

In step 402, an account profile (e.g., account profile 208) may be stored in an account database (e.g., the account database 206) of a processing server (e.g., the processing server 102), where the account profile includes at least an account identifier, a standard personal identification number (PIN), and a blocking PIN. In step 404, a first authorization request for a first payment transaction may be received by a receiver (e.g., the receiving device 202) of the processing server, where the first authorization request is formatted according to one or more standards governing exchange of financial transaction messages and includes at least the account identifier, a merchant identifier, and the blocking PIN.

In step 406, a query may be executed on the account database by a processing device (e.g., the querying module 218) of the processing server to insert the merchant identifier into the account profile. In step 408, a second authorization request formatted according to the one or more standards governing exchange of financial transaction messages may be received by the receiver of the processing server for a second payment transaction, where the second authorization request includes at least the account identifier and the merchant identifier. In step 410, an authorization response may be transmitted by a transmitter (e.g., the transmitting device 224) of the processing server in response to the second authorization request, wherein the authorization response is formatted according to the one or more standards governing exchange of financial transaction messages and includes at least a response code indicating decline of the second payment transaction.

In one embodiment, the second authorization request may include the standard PIN. In some embodiments, the second authorization request may include the blocking PIN. In a further embodiment, the method 400 may further include executing, by the processing device of the processing server, a query on the account database to remove the merchant identifier from the account profile. In one embodiment, the blocking PIN may include three set digits and one variable digit. In a further embodiment, the variable digit blocking PIN included in the first authorization request may be a predetermined value associated with merchant blocking.

In some embodiments, the first authorization request may further include a geographic location; and executing the query on the account database may further insert a geographic area that includes the geographic location into the account profile. In a further embodiment, the method 400 may also include: receiving, by the receiver of the processing server, a third authorization request for a third payment transaction formatted according to the one or more standards governing exchange of financial transaction messages, where the second authorization request includes at least the account identifier and a new geographic location included in the geographic area; and transmitting, by the transmitter of the processing server, a new authorization response in response to the third authorization request, wherein the new authorization response is formatted according to the one or more standards governing exchange of financial transaction messages and includes at least a response code indicating decline of the third payment transaction.

Computer System Architecture

Figure 5:
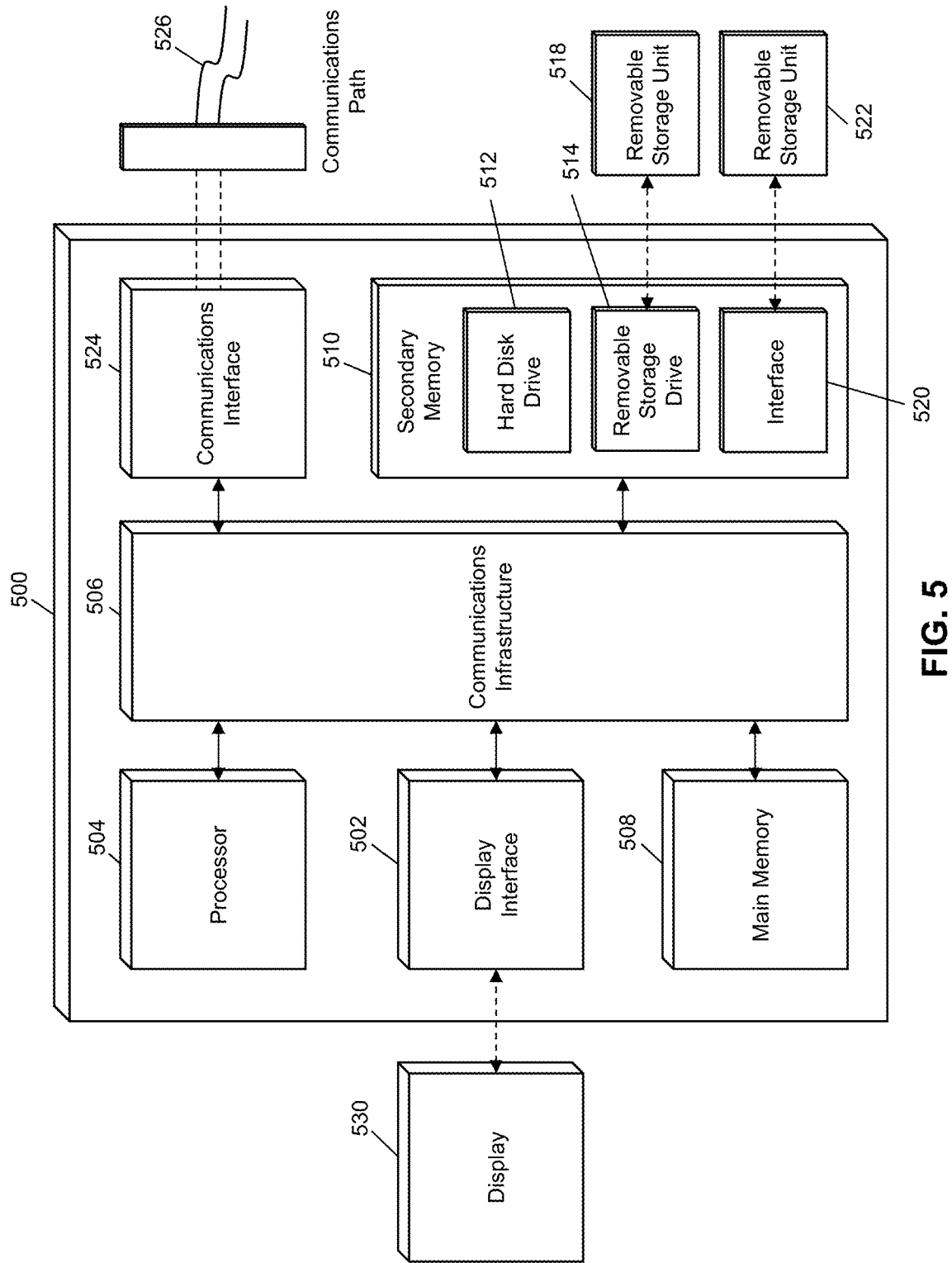
FIG. 5 is a block diagram illustrating a computer system architecture in accordance with exemplary embodiments.

FIG. 5 illustrates a computer system 500 in which embodiments of the present disclosure, or portions thereof, may be implemented as computer-readable code. For example, the processing server 102 of FIG. 1 may be implemented in the computer system 500 using hardware, software, firmware, non-transitory computer readable media having instructions stored thereon, or a combination thereof and may be implemented in one or more computer systems or other processing systems. Hardware, software, or any combination thereof may embody modules and components used to implement the methods of FIGS. 3 and 4.

If programmable logic is used, such logic may execute on a commercially available processing platform configured by executable software code to become a specific purpose computer or a special purpose device (e.g., programmable logic array, application-specific integrated circuit, etc.). A person having ordinary skill in the art may appreciate that embodiments of the disclosed subject matter can be practiced with various computer system configurations, including multi-core multiprocessor systems, minicomputers, mainframe computers, computers linked or clustered with distributed functions, as well as pervasive or miniature computers that may be embedded into virtually any device. For instance, at least one processor device and a memory may be used to implement the above described embodiments.

A processor unit or device as discussed herein may be a single processor, a plurality of processors, or combinations thereof. Processor devices may have one or more processor "cores." The terms "computer program medium," "non-transitory computer readable medium," and "computer usable medium" as discussed herein are used to generally refer to tangible media such as a removable storage unit 518, a removable storage unit 522, and a hard disk installed in hard disk drive 512.

Various embodiments of the present disclosure are described in terms of this example computer system 500. After reading this description, it will become apparent to a person skilled in the relevant art how to implement the present disclosure using other computer systems and/or computer architectures. Although operations may be described as a sequential process, some of the operations may in fact be performed in parallel, concurrently, and/or in a distributed environment, and with program code stored locally or remotely for access by single or multi-processor machines. In addition, in some embodiments the order of operations may be rearranged without departing from the spirit of the disclosed subject matter.

Processor device 504 may be a special purpose or a general purpose processor device specifically configured to perform the functions discussed herein. The processor device 504 may be connected to a communications infrastructure 506, such as a bus, message queue, network, multi-core message-passing scheme, etc. The network may be any network suitable for performing the functions as disclosed herein and may include a local area network (LAN), a wide area network (WAN), a wireless network (e.g., WiFi), a mobile communication network, a satellite network, the Internet, fiber optic, coaxial cable, infrared, radio frequency (RF), or any combination thereof. Other suitable network types and configurations will be apparent to persons having skill in the relevant art. The computer system 500 may also include a main memory 508 (e.g., random access memory, read-only memory, etc.), and may also include a secondary memory 510. The secondary memory 510 may include the hard disk drive 512 and a removable storage drive 514, such as a floppy disk drive, a magnetic tape drive, an optical disk drive, a flash memory, etc.

The removable storage drive 514 may read from and/or write to the removable storage unit 518 in a well-known manner. The removable storage unit 518 may include a removable storage media that may be read by and written to by the removable storage drive 514. For example, if the removable storage drive 514 is a floppy disk drive or universal serial bus port, the removable storage unit 518 may be a floppy disk or portable flash drive, respectively. In one embodiment, the removable storage unit 518 may be non-transitory computer readable recording media.

In some embodiments, the secondary memory 510 may include alternative means for allowing computer programs or other instructions to be loaded into the computer system 500, for example, the removable storage unit 522 and an interface 520. Examples of such means may include a program cartridge and cartridge interface (e.g., as found in video game systems), a removable memory chip (e.g., EEPROM, PROM, etc.) and associated socket, and other removable storage units 522 and interfaces 520 as will be apparent to persons having skill in the relevant art.

Data stored in the computer system 500 (e.g., in the main memory 508 and/or the secondary memory 510) may be stored on any type of suitable computer readable media, such as optical storage (e.g., a compact disc, digital versatile disc, Blu-ray disc, etc.) or magnetic tape storage (e.g., a hard disk drive). The data may be configured in any type of suitable database configuration, such as a relational database, a structured query language (SQL) database, a distributed database, an object database, etc. Suitable configurations and storage types will be apparent to persons having skill in the relevant art.

The computer system 500 may also include a communications interface 524. The communications interface 524 may be configured to allow software and data to be transferred between the computer system 500 and external devices. Exemplary communications interfaces 524 may include a modem, a network interface (e.g., an Ethernet card), a communications port, a PCMCIA slot and card, etc. Software and data transferred via the communications interface 524 may be in the form of signals, which may be electronic, electromagnetic, optical, or other signals as will be apparent to persons having skill in the relevant art. The signals may travel via a communications path 526, which may be configured to carry the signals and may be implemented using wire, cable, fiber optics, a phone line, a cellular phone link, a radio frequency link, etc.

The computer system 500 may further include a display interface 502. The display interface 502 may be configured to allow data to be transferred between the computer system 500 and external display 530. Exemplary display interfaces 502 may include high-definition multimedia interface (HDMI), digital visual interface (DVI), video graphics array (VGA), etc. The display 530 may be any suitable type of display for displaying data transmitted via the display interface 502 of the computer system 500, including a cathode ray tube (CRT) display, liquid crystal display (LCD), light-emitting diode (LED) display, capacitive touch display, thin-film transistor (TFT) display, etc.

Computer program medium and computer usable medium may refer to memories, such as the main memory 508 and secondary memory 510, which may be memory semiconductors (e.g., DRAMs, etc.). These computer program products may be means for providing software to the computer system 500. Computer programs (e.g., computer control logic) may be stored in the main memory 508 and/or the secondary memory 510. Computer programs may also be received via the communications interface 524. Such computer programs, when executed, may enable computer system 500 to implement the present methods as discussed herein. In particular, the computer programs, when executed, may enable processor device 504 to implement the methods illustrated by FIGS. 3 and 4, as discussed herein. Accordingly, such computer programs may represent controllers of the computer system 500. Where the present disclosure is implemented using software, the software may be stored in a computer program product and loaded into the computer system 500 using the removable storage drive 514, interface 520, and hard disk drive 512, or communications interface 524.

The processor device 504 may comprise one or more modules or engines configured to perform the functions of the computer system 500. Each of the modules or engines may be implemented using hardware and, in some instances, may also utilize software, such as corresponding to program code and/or programs stored in the main memory 508 or secondary memory 510. In such instances, program code may be compiled by the processor device 504 (e.g., by a compiling module or engine) prior to execution by the hardware of the computer system 500. For example, the program code may be source code written in a programming language that is translated into a lower level language, such as assembly language or machine code, for execution by the processor device 504 and/or any additional hardware components of the computer system 500. The process of compiling may include the use of lexical analysis, preprocessing, parsing, semantic analysis, syntax-directed translation, code generation, code optimization, and any other techniques that may be suitable for translation of program code into a lower level language suitable for controlling the computer system 500 to perform the functions disclosed herein. It will be apparent to persons having skill in the relevant art that such processes result in the computer system 500 being a specially configured computer system 500 uniquely programmed to perform the functions discussed above.

Techniques consistent with the present disclosure provide, among other features, systems and methods for establishing account controls for a transaction account through specially configured personal identification numbers. While various exemplary embodiments of the disclosed system and method have been described above it should be understood that they have been presented for purposes of example only, not limitations. It is not exhaustive and does not limit the disclosure to the precise form disclosed. Modifications and variations are possible in light of the above teachings or may be acquired from practicing of the disclosure, without departing from the breadth or scope.

What is claimed is:

1. A method for establishing account controls for a transaction account through specially configured personal identification numbers, comprising:

storing, by a processing server, in an account profile of a user in an account database of the processing server, at least an account identifier, a standard personal identification number (PIN), and a blocking PIN, wherein the standard PIN is different from the blocking PIN;

receiving, by a receiver of the processing server, from a point of sale (POS) device of a merchant, a first authorization request for a first payment transaction formatted according to one or more standards governing exchange of financial transaction messages, where the first authorization request includes at least the account identifier, a merchant identifier associated with the merchant, and a first PIN entered by the user at the POS device;

executing, by a processing device of the processing server, a query on the account database and identifying the account profile on a basis of the account identifier included in the first authorization request received from the POS device of the merchant;

determining, by the processing server, whether the first PIN is the blocking PIN by comparing the first PIN with the blocking PIN stored in the account profile;

in response to determining that the received PIN is the blocking PIN, extracting, by the processing server, the merchant identifier from the first authorization request;

modifying, by the processing server, the identified account profile by inserting the merchant identifier in the identified account profile for blocking any future transactions involving the merchant associated with the merchant identifier, and forwarding, by the processing server, the first authorization request to a payment network for processing, receiving, by the receiver of the processing server from the merchant, a second authorization request for a second payment transaction formatted according to the one or more standards governing exchange of financial transaction messages, where the second authorization request includes at least the account identifier and the merchant identifier;

identifying, by the processing server, the modified account profile stored in the account database on a basis of the account identifier included in the second authorization request;

determining, by the processing server, whether the modified account profile comprises the merchant identifier;

based on determining that the modified account profile comprises the merchant identifier, blocking, by the processing server, the second payment transaction from processing; and transmitting, by a transmitter of the processing server, an authorization response for the second payment transaction, wherein the authorization response comprises at least a response code indicating decline of the second payment transaction.

2. The method of claim 1, wherein the second authorization request includes the standard PIN.

3. The method of claim 1, wherein the second authorization request includes the blocking PIN.

4. The method of claim 3, further comprising:

executing, by the processing device of the processing server, a query on the account database to remove the merchant identifier from the account profile.

5. The method of claim 1, wherein the first authorization request further includes a geographic location; and executing the query on the account database further inserts a geographic area that includes the geographic location into the account profile.

6. The method of claim 5, further comprising:

receiving, by the receiver of the processing server, a third authorization request for a third payment transaction formatted according to the one or more standards governing exchange of financial transaction messages, where the third authorization request includes at least the account identifier and a new geographic location included in the geographic area; and transmitting, by the transmitter of the processing server, a new authorization response in response to the third authorization request, wherein the new authorization response is formatted according to the one or more standards governing exchange of financial transaction messages and includes at least a response code indicating decline of the third payment transaction.

7. The method of claim 1, wherein the blocking PIN includes three set digits and one variable digit.

8. The method of claim 7, wherein the variable digit blocking PIN included in the first authorization request is a predetermined value associated with merchant blocking.

9. A system for establishing account controls for a transaction account through specially configured personal identification numbers, comprising:

a transmitter of a processing server;

an account database of the processing server configured to store an account profile of a user, wherein the account profile comprises at least an account identifier, a standard personal identification number (PIN), and a blocking PIN, wherein the standard PIN is different from the blocking PIN;

a receiver of the processing server configured to receive, from a point of sale (POS) device of a merchant, a first authorization request for a first payment transaction formatted according to one or more standards governing exchange of financial transaction messages, where the first authorization request includes at least the account identifier, a merchant identifier associated with the merchant, and a first PIN entered by the user at the POS device; and a processing device of the processing server configured to
(i) execute a query on the account database using the account identifier comprised in the first authorization request,
(ii) identify the account profile on a basis of the account identifier included in the first authorization request received from the POS device of the merchant,
(iii) determine whether the first PIN is the blocking PIN by comparing the first PIN with the blocking PIN stored in the account profile, and
(iv) in response to determining that the received PIN is the blocking PIN,
extract the merchant identifier from the first authorization request,
modify the identified account profile by inserting to insert the merchant identifier in the identified account profile for blocking any future transactions involving the merchant associated with the merchant identifier, and
forward the first authorization request to a payment network for processing, and wherein the receiver of the processing server is further configured to receive from the merchant, a second authorization request for a second payment transaction formatted according to the one or more standards governing exchange of financial transaction messages, where the second authorization request includes at least the account identifier and the merchant identifier, wherein the processing server is further configured to
(i) identify the modified account profile stored in the account database on a basis of the account identifier include in the second authorization request,
(ii) determine whether the modified account profile comprises the merchant identifier, and
(iii) block, based on determining that the modified account profile comprises the merchant identifier, the second payment transaction from processing, and wherein the transmitter of the processing server is configured to transmit an authorization response for the second payment transaction, wherein the authorization response comprises at least a response code indicating decline of the second payment transaction.

10. The system of claim 9, wherein the second authorization request includes the standard PIN.

11. The system of claim 9, wherein the second authorization request includes the blocking PIN.

12. The system of claim 11, wherein the processing device of the processing server is further configured to execute a query on the account database to remove the merchant identifier from the account profile.

13. The system of claim 9, wherein the first authorization request further includes a geographic location; and executing the query on the account database further inserts a geographic area that includes the geographic location into the account profile.

14. The system of claim 13, wherein the receiver of the processing server is further configured to receive a third authorization request for a third payment transaction formatted according to the one or more standards governing exchange of financial transaction messages, where the third second authorization request includes at least the account identifier and a new geographic location included in the geographic area, and the transmitter of the processing server is further configured to transmit a new authorization response in response to the third authorization request, wherein the new authorization response is formatted according to the one or more standards governing exchange of financial transaction messages and includes at least a response code indicating decline of the third payment transaction.

15. The system of claim 9, wherein the blocking PIN includes three set digits and one variable digit.

16. The system of claim 15, wherein the variable digit blocking PIN included in the first authorization request is a predetermined value associated with merchant blocking.

* * * * *